US011586711B2

(12) United States Patent
Smith

(10) Patent No.: US 11,586,711 B2
(45) Date of Patent: Feb. 21, 2023

(54) SYSTEMS AND METHODS FOR SECURING AND CONTROLLING ACCESS TO ELECTRONIC DATA, ELECTRONIC SYSTEMS, AND DIGITAL ACCOUNTS

(71) Applicant: CISCO TECHNOLOGY, INC., San Jose, CA (US)

(72) Inventor: Rich Smith, Ann Arbor, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 870 days.

(21) Appl. No.: 16/411,720

(22) Filed: May 14, 2019

(65) Prior Publication Data

US 2019/0347384 A1 Nov. 14, 2019

Related U.S. Application Data

(60) Provisional application No. 62/671,262, filed on May 14, 2018.

(51) Int. Cl.
*G06F 21/12* (2013.01)
*H04L 9/40* (2022.01)

(52) U.S. Cl.
CPC ........ *G06F 21/125* (2013.01); *H04L 63/0263* (2013.01); *H04L 63/0442* (2013.01); *H04L 63/0876* (2013.01); *H04L 63/1491* (2013.01)

(58) Field of Classification Search
CPC ... H04L 63/0442; H04L 63/08; H04L 63/083; H04L 63/10; H04L 63/101; H04L 63/105;

(Continued)

(56) References Cited

U.S. PATENT DOCUMENTS 7,395,436 B1 * 7/2008 Nemovicher ....... H04L 63/0823
726/28
8,503,974 B2 * 8/2013 Brown .................... G06F 21/31
726/17

(Continued)

OTHER PUBLICATIONS

TechRejects, "Advantages and Disadvantages of Symmetric and Asymmetric Key Encryption Methods" [Online], Aug. 2, 2014 [Retrieved: Mar. 11, 2022], Retrieved from: < https://techrejects.blogspot.com/2014/08/advantages-disadvantages-symmetric-asymmetric-key-encryption-methods.html > (Year: 2014).*

*Primary Examiner* — Eric W Shepperd

(57) ABSTRACT

A system and method of securing a computing device with a remote computer security service includes: identifying a computing device that is subscribed to a remote computer security service, wherein the computing device comprises an anti-authentication application instance provided by the remote computer security service based on the subscription; identifying an occurrence of an anti-authentication action involving the computing device based on anti-authentication policy set to a subscriber anti-authentication account with the remote computer security service for the computing device; responsively to the anti-authentication action, automatically performing by the remote security service or the anti-authentication application instance one or more anti-authentication protective services by protectively altering the computing device based on the anti-authentication policy, wherein the computing device is altered to a protected state from a normal state based on the performance of the one or more anti-authentication protective services.

20 Claims, 3 Drawing Sheets

(58) Field of Classification Search
CPC . H04L 63/1441; H04L 63/1491; G06F 21/10;
G06F 21/125; G06F 21/31; G06F 21/50;
G06F 21/554; G06F 21/62
See application file for complete search history.

(56) References Cited

U.S. PATENT DOCUMENTS

| | | | |
|---|---|---|---|
| 10,893,052 B1* | 1/2021 | Bosworth | G06F 21/629 |
| 11,075,932 B2* | 7/2021 | Sansom | G06F 3/0486 |
| 2002/0198840 A1* | 12/2002 | Banka | H04L 67/30 |
| | | | 705/50 |
| 2003/0196099 A1* | 10/2003 | Lampson | G06F 9/4406 |
| | | | 713/189 |
| 2007/0250920 A1* | 10/2007 | Lindsay | G06F 21/31 |
| | | | 726/7 |
| 2012/0174214 A1* | 7/2012 | Huang | G06F 21/32 |
| | | | 726/19 |
| 2014/0373162 A1* | 12/2014 | Mahaffey | G06F 21/577 |
| | | | 726/25 |
| 2017/0098065 A1* | 4/2017 | Vaughn | G06F 21/36 |
| 2018/0034639 A1* | 2/2018 | Resch | H04L 63/0823 |
| 2018/0122219 A1* | 5/2018 | Caterino | H04W 12/04 |
| 2019/0306300 A1* | 10/2019 | Cohen | H04L 63/102 |
| 2022/0159443 A1* | 5/2022 | Piantedosi | H04W 4/029 |

* cited by examiner

SYSTEMS AND METHODS FOR SECURING AND CONTROLLING ACCESS TO ELECTRONIC DATA, ELECTRONIC SYSTEMS, AND DIGITAL ACCOUNTS

CROSS-REFERENCE TO RELATED APPLICATIONS

This application claims the benefit of U.S. Provisional Application No. 62/671,262 filed 14 May 2018, which is incorporated in its entirety by this reference.

TECHNICAL FIELD

One or more of the inventions described herein generally relate to the computer security field, and more specifically to a new and useful system and method for securing and controlling access to electronic data, systems, and digital accounts in the computer security field.

BACKGROUND

Modern devices and digital accounts associated with these modern devices may function to collect significant amounts of various types of data. These modern devices are often mobility devices, such as mobile phones or mobile tablets, and may be carried on one's person. The various types of data collected by such devices may include data that is passively collected by the device, data that is actively collected by the device, personal data, business data, and the like.

As a modern trend involving these devices, an increasing amount of personal data and business data may be stored on these devices or in association with these devices (e.g., via remote storage such as the cloud) and carried by users on their persons. Because these devices may be found on a user's person, the data that is collected by the device may be vulnerable to compelled access by an unauthorized party or malicious actor. In some specific instances, there have been reported increases in a number of requests compelling users to provide access to their devices or online accounts to a third party in order for the data associated with or stored by the device or online account may be accessed or collected by the third party. These instances of compelled device or online account access render a user's data vulnerable to unauthorized inspection and appropriation.

Thus, there is a need in the computer security field to create new and useful methods for mitigating unauthorized access to computing resources and for controlling access to computing resources. The inventions described herein provide such new and useful systems and methods.

BRIEF SUMMARY OF THE INVENTION(S)

In one embodiment, a method of securing a computing device with a remote computer security service includes: identifying a computing device that is subscribed to a remote computer security service, wherein the computing device comprises an anti-authentication application instance provided by the remote computer security service based on the subscription; identifying an occurrence of an anti-authentication action involving the computing device based on anti-authentication policy set to a subscriber anti-authentication account with the remote computer security service for the computing device; responsively to the anti-authentication action, automatically performing by the remote security service or the anti-authentication application instance one or more anti-authentication protective services by protectively altering the computing device based on the anti-authentication policy, wherein the computing device is altered to a protected state from a normal state based on the performance of the one or more anti-authentication protective services.

In one embodiment, the anti-authentication action relates to a sequence of actions involving an interaction by a user with the computing device that, when performed, causes the remote computer security service or the anti-authentication application instance to protectively alter a state of data of the computing device.

In one embodiment, if no network connectivity can be established between the computing device and the remote computer security service, the anti-authentication application operates independently of the remote computer security service to alter the computing device to the protected state.

In one embodiment, in the protected state, the anti-authentication application instance cloaks a subset of designated protected data maintained on the computing device based on anti-authentication policy associated with a subscriber anti-authentication account with the anti-authentication service.

In one embodiment, cloaking the subset of designated protected data includes encrypting by the remote computer security service or the anti-authentication application instance the subset of designated protected data with a public cryptographic key of an asymmetric key pair of the remote computer security service; and only the private cryptographic key of the asymmetric key pair of the remote computer security service can decrypt the subset of designated protected data and revert the computing device to the normal state.

In one embodiment, in the protected state, the anti-authentication application instance or the remote computer security service deletes designated protected data from one or more memory devices of the computing device based on anti-authentication policy associated with the subscriber anti-authentication account with the remote computer security service.

In one embodiment, the method further includes registering the computing device to the anti-authentication account with the remote computer security service; designating protected data associated with the subscriber device; and enabling access to the protected data to one or more of the remote computer security service and the anti-authentication application instance.

In one embodiment, registering a first anti-authentication action with the subscriber anti-authentication account; and registering an authentication action with the subscriber anti-authentication account that reverts the subscriber device from the protected state to the normal state, wherein the registered authentication action is distinct from a standard authentication action implemented for accessing the computing device in the normal state.

In one embodiment, the anti-authentication action includes an input of anti-authentication credentials at the computing device, the anti-authentication credentials including a set of credentials that is registered with the remote computer security service that, when received at the computing device, causes the anti-authentication application instance to covertly alter a state of the computing device to protect one or more features or data of the computing device while contemporaneously providing access to the computing device In one embodiment, the anti-authentication credentials relate to credentials for an illegitimate access to or an illegitimate control of the computing device that differ from authentication credentials for a legitimate access to or a legitimate control of the computing device.

In one embodiment, a plurality of distinct of anti-authentication credentials are registered to the subscriber's anti-authentication account with the anti-authentication service; each of the plurality of distinct anti-authentication credentials, when received at the computing device, causes an execution of a distinct anti-authentication protection of the computing device.

In one embodiment, the method further includes at a registration of the subscriber anti-authentication account with the remote computer security service: identifying a blacklist of computer device items comprising a selection one or more configuration states, one or more functions, one or more types of data, one or more corpus of data, one or more features, or one or more applications of the computing device; and in response to receiving anti-authentication credentials at the computing device, automatically and protectively altering the blacklist of computer device items.

In one embodiment, the method further includes at a registration of the subscriber anti-authentication account with the remote computer security service: identifying a whitelist of computer device items comprising a selection one or more configuration states, one or more functions, one or more types of data, one or more corpus of data, one or more features, or one or more applications of the computing device; and in response to receiving anti-authentication credentials at the computing device, automatically and protectively altering the computer device with an exception to the whitelist of computer device items.

In one embodiment, a method of securing an online subscriber account with a remote security service, the method comprising: identifying an online subscriber account that is subscribed to a remote security service, wherein the online subscriber account comprises an anti-authentication application instance provided by the remote computer security service based on the subscription; identifying an occurrence of an anti-authentication action involving the online subscriber account based on anti-authentication policy set to a subscriber anti-authentication account with the remote security service for the online subscriber account; responsively to the anti-authentication action, automatically performing by the anti-authentication application instance one or more anti-authentication protective services by protectively altering the online subscriber account based on the anti-authentication policy, wherein the online subscriber account is altered to a protected state from a normal state based on the performance of the performance of the one or more anti-authentication protective services.

In one embodiment, the anti-authentication action relates to a sequence of actions involving an interaction by a user with the online subscriber account that, when performed, causes the remote computer security service or the anti-authentication application instance to protectively alter a state of data of the online subscriber account.

In one embodiment, the anti-authentication action includes an input of anti-authentication credentials at the online subscriber account, the anti-authentication credentials including a set of credentials that is registered with the remote computer security service that, when received via an interface associated with the online subscriber account, causes the anti-authentication application instance to covertly alter a state of the online subscriber account to protect one or more features or data of the online subscriber account while contemporaneously providing access to the computing device.

In one embodiment, in the protected state, the anti-authentication application instance or the remote computer security service deletes designated protected data from one or more memory devices associated with the subscriber online account based on anti-authentication policy associated with the subscriber anti-authentication account with the remote computer security service.

In one embodiment, a computer program product for securing a computing resource with a remote computer security service includes a non-transitory computer-readable medium storing computer-executable instructions that, when executed by one or more computer processors, causes the one or more computer processors to perform: identifying a computing device that is subscribed to a remote computer security service, wherein the computing device comprises an anti-authentication application instance provided by the remote computer security service based on the subscription; identifying an occurrence of an anti-authentication action involving the computing device based on anti-authentication policy set to a subscriber anti-authentication account with the remote computer security service for the computing device; responsively to the anti-authentication action, automatically performing one or more anti-authentication protective services by protectively altering the computing device based on the anti-authentication policy, wherein the computing device is altered to a protected state from a normal state based on the performance of the one or more anti-authentication protective services.

In one embodiment, the anti-authentication action relates to a sequence of actions involving an interaction by a user with the computing device that, when performed, causes the remote computer security service or the anti-authentication application instance to protectively alter a state of data of the computing device.

In one embodiment, the anti-authentication action relates to a sequence of actions involving an interaction by a user with the online subscriber account that, when performed, causes the remote computer security service or the anti-authentication application instance to protectively alter a state of data of the online subscriber account.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As described in the above background section, instances of compelled device or digital account access are increasing thereby rendering device, system, or digital account data vulnerable to unauthorized inspection and appropriation.

The embodiments of the present application, however, enable covert anti-authentication which allows a user to register an anti-authentication credential to a device, system, or digital account or service that is distinct from their standard authentication credential for a given device, system, or digital account or service. The anti-authentication credentials may function to signal to an anti-authentication service or anti-authentication application instance that access to the device, system, or digital account is being made under duress (compelled or otherwise, unlawfully) which triggers an execution of one or more predefined actions for securing the device, system, or digital account or service from intrusion while allowing a compelling actor to access the device, system, or digital account after alteration. Accordingly, one or more embodiments of the present application function to covertly alter the device, system, or digital account to secure or otherwise, eliminate sensitive data, features, applications, or the like from a subscribing user's device, system, or digital account.

1. System for Anti-Authentication of a Computing Device or System Account

Figure 1:
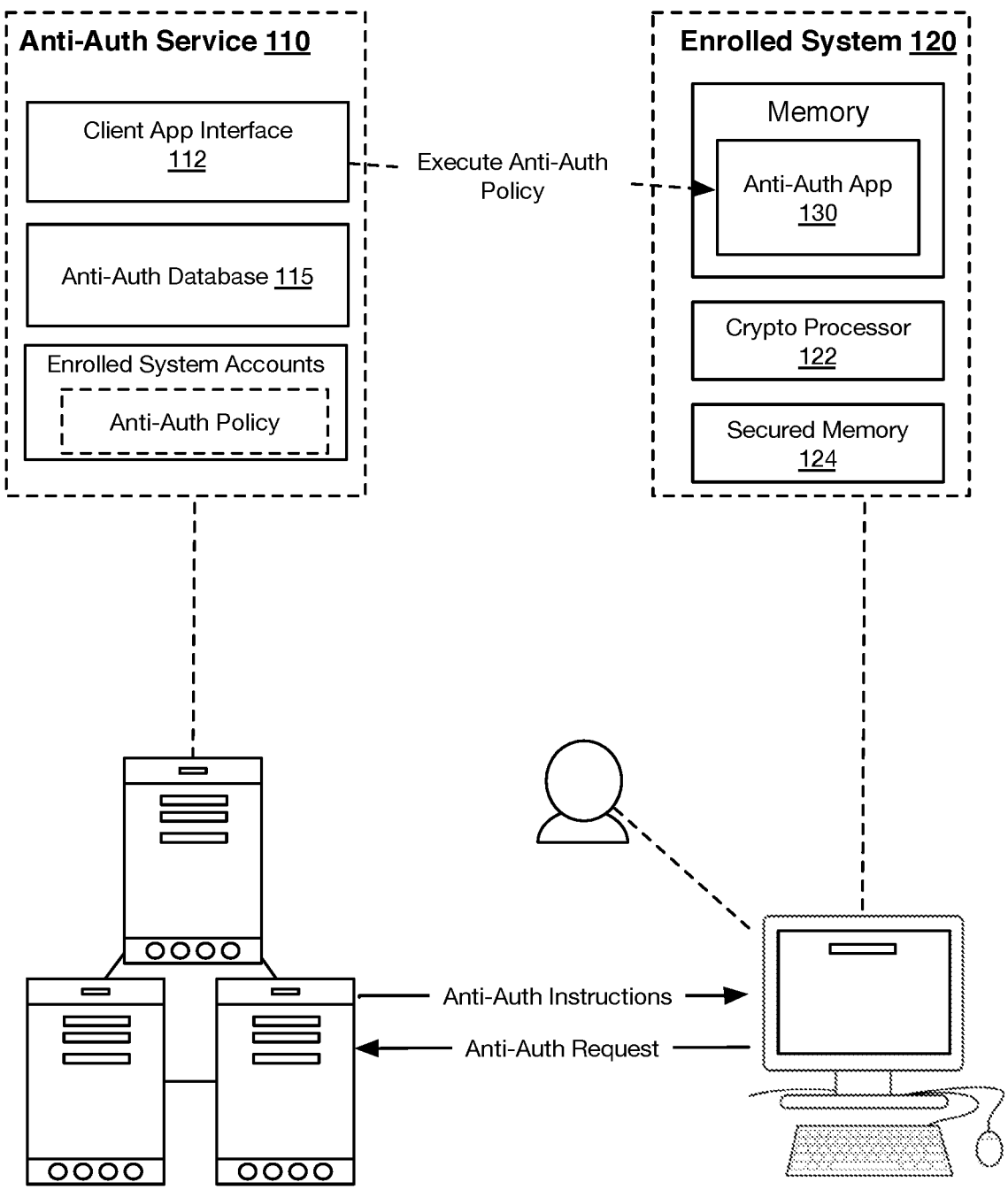
FIG. 1 illustrates a schematic representation of a system for securing data of a computing device in accordance with one or more embodiments of the present application.

As shown in FIG. 1, an anti-authentication system 100 for controlling access to and/or securing electronic data of a computing device, a computing system, and/or a digital account (or online account) includes a remote anti-authentication service 110 (or anti-auth platform), a remote anti-authentication database 115, one or more user devices and/or digital accounts 120, and anti-authentication application instance 130.

The remote anti-authentication service 110 may be a multitenant anti-authentication service hosted in a distributed computing infrastructure (e.g., the cloud, or the like). The anti-authentication service is preferably a service provided alongside authentication services of a broader authentication platform used by service providers or the like to supplement or provide a layer of authentication (or optionally authorization) to the service provider system. The remote anti-authentication service 110 is preferably configured to execute the steps of the one or more methods and variations described herein. The remote anti-authentication service may include an anti-authentication client application interface 112 that enables the anti-authentication service 110 to operably communicate and/or remotely control the anti-authentication application instance 130.

The remote anti-authentication database 115 may preferably be used by the remote anti-authentication service 110 to provide a (cryptographically) secure storage location for protected data, features, functionalities, configurations, and the like of the protected user devices, systems, and/or digital accounts 120. Accordingly, during an anti-authentication operation or service (e.g., protective action(s)), the remote anti-authentication service 110 may function to communicate protected data, applications, and/or features, and the like from a user device, system, and/or digital account 120 to the remote anti-authentication database 115. The remote anti-authentication database 115 may function to augment the protected elements from the user device, system, and/or digital account 120 with metadata including timestamp information that may be used in a restoration function or operation of the user device, system, and/or digital account 120.

The one or more user devices, system, and/or digital accounts 120 may be subscribed or enrolled into the anti-authentication service(s) of the remote anti-authentication service 110. Additionally, the one or more user devices, systems, and/or digital accounts 120 (i.e., enrolled system (s)) may include or have access to an associated cryptographic processing unit or element 122 (e.g., a hardware security module or the like) that enables the creation or generation, storage, and/or use of symmetric or asymmetric cryptographic keys that may be used to cryptographically secure data and/or one or features of the one or more user devices and/or digital accounts 120. In some embodiments, the one or more user devices, systems, and/or digital accounts 120 may include a secured memory 124 that may be cryptographically secured (i.e., encrypted) and/or tamperproof. In one or more anti-authentication services or operations, protected data, applications, or features of the one or more user devices, systems, and/or digital accounts 120 may be transferred from a first less secure memory or storage location to the more secure secured memory 124. The secured memory 124 may be secured with any suitable encryption scheme including using symmetric or asymmetric cryptographic keys and the like.

The anti-authentication application instance 130 may function to operate cooperatively or independently of authentication service to perform anti-authentication services or operations. In the case that there is limited, intermittent, or no network connectivity between a user device, system, and/or online user account, the anti-authentication application instance 130 may function to perform all or substantially all of the anti-authentication operations and/or services in response to the detection of an anti-authentication action or credentials.

Additionally, or alternatively, the anti-authentication application instance 130 may function to provide an interface or dashboard usable by a user to select data and/or features associated with a user device, system, and/or online user account that the user desires to protect with the anti-authentication service.

Figure 2:
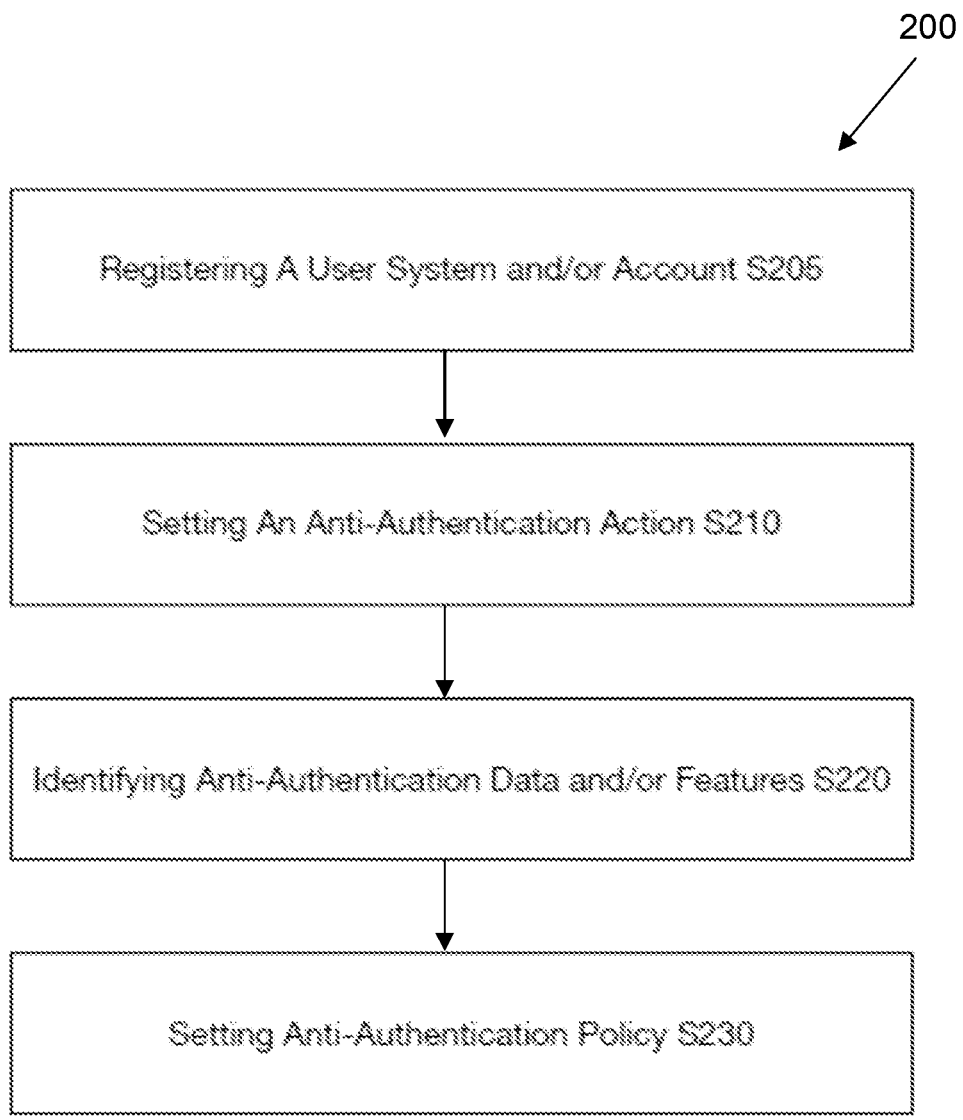
FIG. 2 illustrates a method for configuring anti-authentication security parameters of a computing device, computing system, or digital account in accordance with one or more embodiments of the present application.

2. Method for Configuring Anti-Authentication Service for a Computing Device, a Computing System, and/or a Digital Account As shown in FIG. 2, a method 200 for configuring anti-authentication for a device, system, and/or online account includes registering a user device, user system, and/or an online or digital user account S205, setting anti-authentication(s) actions S210, identifying anti-authentication data and/or configuration states S220, and setting anti-authentication policy S230.

S205, includes registering (enrolling) or subscribing a user device, user system, and/or an online user account (or digital account) to an anti-authentication service (or anti-auth platform). In a preferred embodiment, the anti-authentication service functions to interact with the user device, system, and/or online user account over one or more networks (e.g., the Internet or any suitable network) when activated. Additionally, or alternatively, the anti-authentication service may exist as a client (anti-authentication) application instance hosted by a system of user device, system, and/or online user account and may function to operate independent of any network or the anti-authentication service (when disconnected from a network or a remote anti-authentication service is inaccessible). That is, in such embodiment, while the client application instance may typically function to operate in communication over one or more networks with one or more web servers or the like of a remote anti-authentication service, the client application instance may also function to perform one or more of the steps and/or processes of the method(s) 200 and/or 300 without having to interact with the one or more servers of the remote anti-authentication service over the one or more networks.

A user device, system, and/or an online user account may be enrolled into the anti-authentication service in a number of different manners. Enrolling the user device, system, and/or the online user account, preferably, establishes the communication between the anti-authentication service and the user device (e.g., via a client application instance installed on the user device, etc.) and/or the online user account. the communication channel between the anti-authentication service and the user device, system, and/or online user account may be encrypted (i.e., cryptographically secured) using any suitable cryptography scheme (e.g., symmetric or asymmetric crypto keys, etc.). In a first variation, a user may self-enroll into the anti-authentication service. Self-enrollment may include registering through an account portal of the anti-authentication service. Additionally, registering preferably includes creating a user account linked to one or more user identifiers. For example, an email address or username may be used as a user identifier within the anti-authentication service. Registering with the service, additionally, includes providing communication addressing (e.g., phone number of user device or other, addressing mechanism), such as a phone number (possibly associated with the user device if the user device is a mobile phone or the like). In a second variation, a user may have been previously enrolled to an authentication service and may select to activate an anti-authentication service for a previously subscribed user device and/or online user account.

2.1 Setting Anti-Authentication Credentials

S210, which includes setting an anti-authentication action, functions to enable a user and/or a subscriber of the anti-authentication service to set the authentication action(s) that triggers the operation of the anti-authentication services or operations for a given user device, system, and/or online user account. An anti-authentication action, as referred to herein, generally relates to a sequence or series of actions involving an interaction by a user with a user device, user system, and/or an online user account that, when performed, in an attempt to authenticate to the user device or account that causes an anti-authentication service, anti-authentication client application instance, or the like to protectively alter a state of data, state of features, state of application, or a configuration state of the user device, system, and/or the online user account. Additionally, or alternatively, the anti-authentication action may be a single action or a single operation by a user or the like that involves an interaction with a user device and/or an online user account that, when performed, cause an anti-authentication service or the like to alter a state of data, features, applications, or a configuration state of the user device, system, and/or the online user account. Accordingly, an anti-authentication action may be any suitable action or set of suitable actions that is user-defined for purposes of causing an operation of the pre-selected or predefined anti-authentication services or operations to be performed against a user device, user system, and/or an online user account.

Additionally, or alternatively, setting an anti-authentication may include setting anti-authentication credentials. Anti-authentication credentials preferably function to alter one or more states of data, features, applications, and/or configuration of a user device, user system, and/or an online user account but like normal or standard authentication credentials, anti-authentication credentials may allow for access to the user device, user system, and/or the online user account after or during an alteration. That is, while the anti-authentication credentials may function to covertly alter the user device, user system, and/or online user account, the anti-authentication credentials may simultaneously or contemporaneously (e.g., within less than a minute or the like) provide access to the user device, user system, and/or online user account post alterations. Thus, S210 may function to without detection and without a trace (i.e., covertly) manipulate one or more protected features, protected data, protected configurations, and/or the like responsive to a receipt and/or detection of the anti-authentication credentials to the user device, user system, and/or online user account.

In a preferred embodiment, setting an anti-authentication action includes defining an input of a set of anti-authentication credentials to a user device, user system, and/or to an online user account. For instance, anti-authentication credentials may include user anti-authentication (credentials) input including a pin code, a challenge question response, a password, biometric input (e.g., a particular fingerprint, a specific facial feature, etc.), passing a token, performing one or more pre-defined actions with the user device, system, or account (or some combination of the aforementioned) or any suitable input defined by the user as anti-authentication credentials that trigger one or more anti-authentication services or operations. The anti-authentication credentials may enable a user to register an additional set of credentials for a user device and/or an online user account in addition to pre-existing authentication credentials for authenticating into the user device and/or the online user account.

Preferably, the anti-authentication credentials comprise user credentials that differ from (primary or standard) authentication credentials for accessing and/or controlling an associated user device, system, and/or an online account of the user. That is, a subject user device, subject system, and/or a subject online user account may have a first set of standard (or primary) authentication credentials for a standard (normal) use, legitimate access, and/or operation thereof and a second set (or more) of anti-authentication credentials for protectively altering one or more states of the user device, system and/or online user account for an illegitimate access, a non-standard or non-normal protected use of the user device, system, and/or online user account. Preferably, the anti-authentication credentials and the standard authentication credentials for a user device, system, and/or an online user account contains credentials that are not overlapping (non-overlapping) or not the same as the standard authentication credentials. In a preferred embodiment, the standard or primary authentication credentials may only be registered with the user device, user system, and/or online user account whereas the anti-authentication credentials may be registered with both the user device, user system, and/or online user account and the anti-authentication service.

In one implementation, S210 may enable a setting of multiple anti-authentication credentials for a user device, system, and/or online user account. Thus, multiple anti-authentication credentials may be stored in association with the subscription (anti-authentication service) account of a user at the anti-authentication service. In such implementation, multiple disparate anti-authentication credentials may be set for multiple disparate anti-authentication services or operations for the user device, system, and/or online user account. For instance, a first set of anti-authentication credentials may be set that, when executed or provided by a user, function to cause the anti-authentication service to automatically delete selected (sensitive) data from the user device or user account. In another example, a second set of anti-authentication credentials may be set that, when executed or provided by a user, function to cause the anti-authentication service and/or application to automatically cloak or hide selected protected data of a user device, user system, and/or user account. As referred to herein, sensitive data may relate to blacklisted or non-whitelisted data, as described further below. In such instance, a second set of anti-authentication credentials may be set that, when executed or provided by the user, function to cause the anti-authentication service to automatically move selected (sensitive) data from a first non-secure storage location of a user device to a second (cryptographically) secure storage location. Accordingly, multiple, distinct anti-authentication credentials may be set of a given subscriber account to the anti-authentication service where each distinct anti-authentication credential when detected performs a distinct anti-authentication protection or security action to protect the user device, user system, and/or user account. It shall be noted that the one implementation of S210 should not be limited to the above-described examples and that two or more multiple anti-authentication credentials may be set for two or more disparate anti-authentication services or operations for a user device, system, and/or online user account.

2.2 Identifying Anti-Authentication Data, Features, Configurations, Applications of a Computing Device, System, or Digital Account S220, which includes identifying anti-authentication data and/or configuration states, functions to receive one or more selections of sensitive data and/or identification of one or more features, one or more corpus of data, applications, and/or configuration states of a user device, system, and/or online user account to alter in response to detecting an input of anti-authentication credentials.

In a first implementation, S220 may enable a user to selectively blacklist data, settings, applications, transactions, and/or any suitable alterable feature or configuration of a user device, system, and/or online user account. Blacklisting preferably functions to identify to the anti-authentication service (or anti-authentication client application instance) the data and/or the one or more features of the user data, system, and/or online user account that a user desires to protect by some act of alteration, modification, movement, concealment, and/or deletion. A few examples of data that may be protected include a list of dialed numbers, contacts listed in a digital phonebook, credentials or sessions for online accounts and services, photographs, tracked locations, biometric data, any business data, documents, and the like. It shall be noted that the type of data that may be protected shall not be limited to the above-listed examples and may include any recognizable data that may be collected or otherwise obtained by a user device, user system, and/or online user account.

Additionally, or alternatively, S220 may enable a user to select any suitable combination of data, applications, features, and/or the like to protect via the authentication service. For instance, a user may select a business application on a user device and also, select business data generated by the business application that may be stored on the user device as blacklisted items to alter in response to receiving anti-authentication credentials. In another example, the user may select functionality to deactivate, such as a tracking feature (e.g., GPS), and also, select a subset (or all) of historical tracking data generated by the tracking feature to delete or otherwise, move into a secure storage location.

In a second implementation, S220 may enable a user to selectively whitelist data, settings, applications, transactions, and/or any suitable alterable feature or configuration of a user device and/or online user account. Whitelisting preferably functions to identify to the authentication service the data and/or the one or more features of the user data, system, and/or online user account that a user desires to remain unaltered, unaffected, and/or unchanged in response to a detection of an input of the anti-authentication credentials. According, in some embodiments, all data, features, and/or configurations of a user device, system, and/or online user account may be deleted or changed according to anti-authentication policy in response to a detection of the anti-authentication credentials and the whitelisted data, features, applications, and/or configurations of the user device, system, and/or online user account may maintain a normal functionality and may be unchanged by the authentication service.

2.3 Selecting Anti-Authentication Policy/Protocols (Operations, Actions, Services)

S230, which includes setting anti-authentication policy, functions to enable a selection and/or a setting of anti-authentication policy that defines the one or more anti-authentication protective services (actions) and/or anti-authentication operations to be applied to the user device, system, and/or the online user account in response to a detection of an authentication action (authentication credentials).

In a first implementation, S230 enables a selection of one or more pre-defined authentication policies. In such first implementation, an authentication service may generate or provide a plurality of predefined anti-authentication policies. The plurality of anti-authentication policies may be generated based on a type and/or kind (i.e., based on specifications and/or features of the devices or accounts) of user device, system, and/or online user account registered with the authentication service. Accordingly, the authentication service may generate anti-authentication policies specific to a user's device, system, and/or online user account.

In this first implementation, a user may select one or more pre-defined authentication policies for each of one or more authentication credentials registered to anti-authentication account at the authentication service. That is, S230 may enable a configuration in which multiple, disparate authentication credentials registered for a given anti-authentication account may correspond to a selected, distinct predefined authentication policy.

In a second implementation, S230 enables a setting of anti-authentication policy for a given anti-authentication account. In such first implementation, a user associated with the anti-authentication account at the authentication service may define one or more anti-authentication policies for a registered user device, system, and/or online user account.

The one or more anti-authentication policies according to S230 may be defined in any suitable manner to perform any suitable anti-authentication services and/or operations. A first example anti-authentication policy may include deleting blacklisted data and/or features of a user device and/or an online user account in response to a detection of an anti-authentication action. A second example anti-authentication policy may include preserving only whitelisted data and/or features of a user device and/or an online user account and deleting all other data and features in response to a detection of an anti-authentication action. A third example anti-authentication policy may include moving blacklisted data and/or features of a user device and/or an online user account from a first unsecure or a less secure location to a second secure or more secure location. For instance, in this third example, in response to a detection of an anti-authentication action, an anti-authentication service or the like may move blacklisted data from a memory of a user device to a secure and remote storage location (e.g. the cloud or the like) managed by the anti-authentication service. A fourth example anti-authentication policy may include altering a state of a registered user device, system, and/or online user account from a first (normal state) state to a second (protected state) state. For instance, in response to detecting an anti-authentication action, an anti-authentication service and/or anti-authentication application instance hosted on a user device or associated with an online user account may function to modify the user device and/or the online user account to a diminished level of access and/or operability. In such instance, the anti-authentication service or application may selectively remove blacklisted features (e.g., selectable tabs or options, selectable applications, and the like) and/or functionalities from the user device or online user account.

Figure 3:
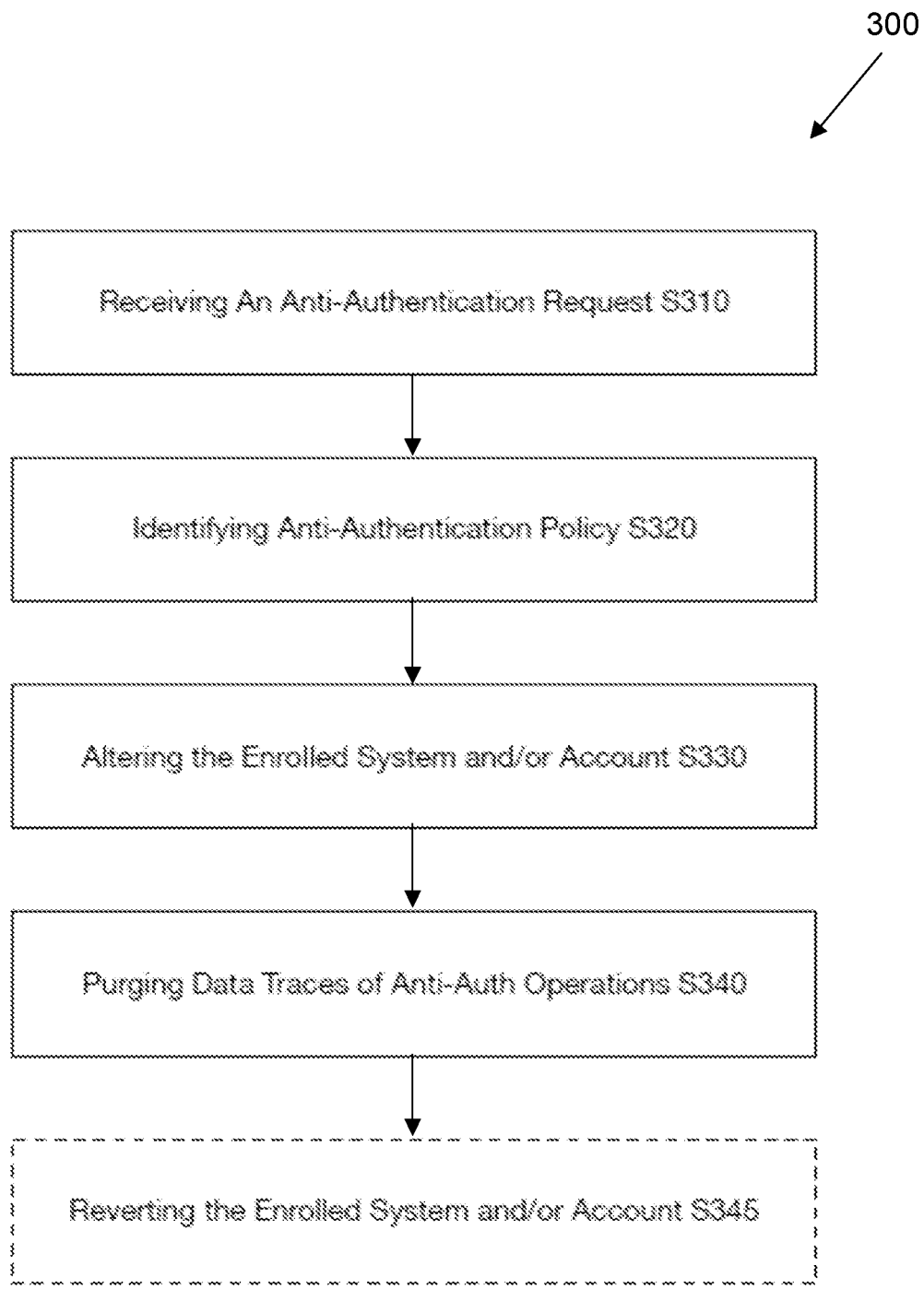
FIG. 3 illustrates a method for securing data of a computing device, computing system, or digital account in accordance with one or more embodiments of the present application.

3. Method of Securing and/or Controlling Access to a Device, System, or Digital Account As shown in FIG. 3, a method 300 for securing digital resources and/or computing resources of a user device, system, and/or online user account includes receiving an anti-authentication request S310, identifying anti-authentication policy based on anti-authentication credentials S320, altering the user device, system, and/or online user account S330, and purging data traces of the reconfiguration or modification S340. Optionally, the method 300 includes reverting the user device, system, and/or the online user account S345.

S310, which includes receiving an anti-authentication request, functions to obtain a request for anti-authentication services or operations for a registered user device or registered online user account. In a preferred embodiment, the anti-authentication request is triggered based on a detection of anti-authentication action including a receipt of anti-authentication credentials or the like. Preferably, the anti-authentication request is received at a remote anti-authentication service to which a user has subscribed to its services. Additionally, or alternatively, the anti-authentication request may be received at an anti-authentication client application instance hosted by the user device or hosted by a system that manages the online user account.

In a preferred embodiment, a user may enter or provide anti-authentication credentials or perform an anti-authentication action using one or more interface components or features of a user device, system, and/or online user account. For instance, an anti-authentication action may be performed by actuating one or more physical buttons (e.g., up/down volume buttons, on/off buttons, etc.) of a mobile phone for performing an anti-authentication action. In another example, anti-authentication credentials may be received by simply selecting virtual user interface buttons on a touch panel or screen of a mobile phone of a user. It shall be noted that any combination of virtual and/or physical actions (e.g., shaking, waving, a predetermined movement of a user, and/or the like) may be used by an anti-authenticator to perform an anti-authentication action or to provide anti-authentication credentials.

Additionally, or alternatively, S310 may enable to provide anti-authentication credentials while the user device, system, and/or online account is locked or otherwise, inaccessible until proper authentication credentials are provided by the user.

According, in one implementation, S310 may enable a user to provide anti-authentication credentials or perform an anti-authentication action at a lock screen of a user device, system, and/or online user account. For instance, prior to accessing a subset of functionalities a user's mobile phone, the mobile phone may present a lock screen requesting authentication credentials, such as a pin code. At the lock screen a user may provide anti-authentication credentials comprising an anti-authentication pin code that triggers one or more anti-authentication operations and/or service, as well as provides access to the subset of functionalities of the user's mobile phone that are only accessible upon detection of successful authentication credentials.

In a second implementation, S310 may enable a user to provide anti-authentication credentials or perform an anti-authentication action after successful negotiating a lock screen of a user device, system, and/or online user account. In such implementations, S310 may enable a user to provide the anti-authentication credentials or perform the anti-authentication action using an anti-authentication application instance hosted by the user device, system, and/or online user account.

S320, which includes mapping the anti-authentication request to an anti-authentication policy, functions to map the anti-authentication request to an anti-authentication account and an appropriate anti-authentication policy. In some embodiments, the anti-authentication request includes user account data, such as an anti-authentication account identifier, and one or more details surrounding the circumstances of the user device and/or the online user account. The details surrounding the circumstances of the user device and/or online user account may inform a reason for triggering the anti-authentication services and/or operations. For instance, the user device may automatically append geolocation data with the anti-authentication request that indicates that the user carrying the user device is located near or at a location (e.g., a country border, an airport, etc.) at which a user's device may be subject to intrusion. The details surrounding the circumstances of the user device and/or the online user account may be used as a mechanism for validating or confirming (e.g., confirming that the credentials were not entered inadvertently or the like) the anti-authentication request.

Additionally, or alternatively, when an identified anti-authentication account includes multiple anti-authentication credentials and/or multiple, disparate anti-authentication policies, S320 functions to map the anti-authentication credentials to a select authentication policy anti-authentication data provided with the anti-authentication request. For instance, an anti-authentication account at an anti-authentication service may include a first anti-authentication credential, such as the pin code "1111", mapped to a first anti-authentication policy and also, include a second anti-authentication credential, such as pin code "2222", mapped to a second anti-authentication policy. An anti-authentication request received from a user device may include an indication that the second anti-authentication credential was provided as input thereby causing the anti-authentication service to map the anti-authentication request to the second anti-authentication policy and correspondingly, execute the same.

Additionally, or alternatively, S320 may function to provide a resultant anti-authentication token to a third-party identity or authentication service to proactively message to multiple reliant parties that precautions or other security measures should be taken regarding a specific user's data, systems, and/or online user accounts.

Additionally, or alternatively, in response to the detection of the anti-authentication credentials, S320 may function to generate anti-authentication alerts that may be provided to pre-designated systems, devices, entities, data security personnel, or users.

S330, which includes altering the user device, system, and/or online user account, functions to execute the one or more anti-authentication services or operations in response to detecting the anti-authentication action. Preferably, the one or more anti-authentication services or operations include one or more predetermined actions that anti-authentication application instance and/or an anti-authentication performs to control access to one or more computing resources associated with the user device, system, and/or online user account.

In a first implementation, S330 functions to alter data and/or alter a state of data associated with a user device, system, and/or online user account. Generally, the anti-authentication policy governs the one or more predefined actions (i.e., anti-authentication services or operations) are performed. Accordingly, in some embodiments, the anti-authentication policy that is triggered by the detection of an anti-authentication credential may cause the automatic execution of anti-authentication operations that cause an alteration of data by deleting a subset or all data from a user device, system, and/or online user account.

Additionally, or alternatively, the anti-authentication policy that is triggered by the detection of an authentication credential may cause the automatic execution of anti-authentication operations that cause an alteration of a state and/or a configuration of data by rendering the data inaccessible through normal means (e.g., by selecting user interface objects or the like of a device or account). In such instances, the anti-authentication operations may function to remove or delete selectable tabs, selectable icons or objects that would normally provide access to the data that the user desires to protect. In this way, the data may be preserved but otherwise, obfuscated from third-parties who are unauthorized to access the protected data.

In a second implementation, S330 functions to alter an arrangement and/or a configuration of data associated with a user device, system, and/or online user account. In such implementation, S330 may function to perform a data substitution or replacement that includes replacing protected data with unprotected data. The unprotected data may be fictitious data derived or otherwise, generated by an anti-authentication service or anti-authentication application instance. Alternatively, the unprotected data may include a dataset provided by or curated by a user. Additionally, or alternatively, in such implementation, S330 may function to move or reposition the protected data to a new storage location and/or unusual storage location of the user device, system, and/or online user account. In such instance, S330 may move the protected data from a normal storage location where it would typically be found to an obvious storage location associated with another application, feature, or functionality of a user device, system and/or online account. In this way, a location of the protected data is obfuscated from detection, but is not deleted or otherwise, destroyed permanently.

In a third implementation, S330 may function to alter one or more functionalities of a user device, system, and/or online user account in response to detection an anti-authentication input. In such implementation. S330 may function to diminish one or more functionalities of the user device, system, and/or online user account so that protected data and/or protected features of the user device, system, and/or online user account may not be accessed. For instance, S330 may function to alter a functionality of a touch screen interface of a mobile device of a user, such that portions or all of the interface may not be operable (or portions of the interface at locations of protected applications or data may not be operable, etc.). It shall be noted that S330 may function to alter any suitable functionality of the user device, system, and/or online user account to protect or prevent access to protected data or protected features.

It shall be noted that any combination of the first implementation, the second implementation, the third implementation, and/or derivations thereof may be implemented in an anti-authentication operation or service to protect data and/or features of a user device, system, and/or online user account.

Additionally, the alterations of the user device, system, and/or online user account may permanent or temporary. A permanency and/or effect of one or more anti-authentication operations and/or services applied against a user device, system, and/or online user account may be based on a user preference elected at a time of setting (e.g., during registration or the like) the anti-authentication action or credentials. Accordingly, a user may elect that one or more anti-authentication credentials have associated anti-authentication operations or services with permanent alterations or with temporal alteration being ephemeral with time.

In the case that S330 implements anti-authentication operations or services that function to permanently alter data and/or one or more features of a user device, system, and/or online user account, the alterations to the user device, system, and/or online account may not be reversed; however, in some instances, S330 may cause the anti-authentication service or the like to store a backup copy of the state (e.g., configurations, data, features, and the like) of the device, system, and/or online user account that may be retrieved by the user in a secure manner.

In the case that S330 implements anti-authentication operations or services that function to temporarily alter data and/or one or more features of a user device, system, and/or online user account, the alterations to the user device, system, and/or online account may be reversed after some set or predetermined condition. The predetermined conditions may include reverting the user device, system, and/or online user account to an unaltered or original state (i.e., prior to the anti-authentication operations or services) after a passage of a predetermined period of time, after leaving an unsecure location, after an entry of the anti-authentication credentials (or action) a subsequent time, after syncing the device, system or account to a secure (a reversionary) source (e.g., a secure server, a secure computer, etc.), or after an entry of reversionary authentication credentials distinct from the anti-authentication credentials (and the standard or primary credentials) that operate to restore the user device, system, and/or online user account. it shall be noted that any suitable condition may be set to enable the user device, system, and/or online user account to be reverted to an unaltered state or the like.

S340, which includes purging data traces of the reconfiguration or modification of the anti-authentication operations, functions to eliminate data traces indicating that an anti-authentication operation or service was implemented on a user device, system, and/or online user account. Accordingly, S340 may activate a sweeping or cleaning operation that functions to delete data traces indicating that an anti-authentication credential was input or received or that anti-authentication action was input or received. This may include deleting data relating to the anti-authentication credential values, deleting data relating to actuated physical or virtual buttons involved in an anti-authentication action, deleting data or a record of the alterations performed by an anti-authentication operation or service, deleting data relating to communications or connections between an anti-authentication service and the user device, system, and/or online user account, deleting data relating to an activation and/or actuation of an anti-authentication application instance on a user device, system, or account, a deletion of an anti-authentication application instance, and the like. It shall be noted that S340 may be implemented in any suitable manner to eliminate any data traces or evidence that an anti-authentication operation and/or service was triggered and executed against a user device, system, and/or online user account.

Additionally, or alternatively, once a sweeping or cleaning operation is performed and/or completed, S340 may function to enable access to the altered user device, system, and/or online user account. That is, S340 may enable access to the user device, system, and/or online account using the anti-authentication credentials without having received the primary or standard authentication credentials for a user device, system, and/or online user account.

S345, which optionally includes reverting the user device, system, and/or the online user account, functions to revert the user device, system, and/or online user account to a first state prior to the activation and execution of the anti-authentication operations and/or services, as described in S330. The reversion of the user device, system, and/or online user account may be performed automatically based on one or more predetermined conditions or may be triggered by manual input from a user.

One or more instances of the method and/or processes described herein can be performed asynchronously, concurrently (e.g., in parallel), or in any other suitable order and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method of securing a computing device with a remote computer security service, the method comprising:
    identifying a computing device that is subscribed to a remote computer security service, wherein the computing device comprises an anti-authentication application instance provided by the remote computer security service based on a subscription;
    identifying an occurrence of an anti-authentication action involving the computing device based on an anti-authentication policy set to a subscriber anti-authentication account with the remote computer security service for the computing device;
    responsively to the anti-authentication action, automatically performing by the remote computer security service or the anti-authentication application instance one or more anti-authentication protective services by protectively altering the computing device based on the anti-authentication policy, wherein the computing device is altered to a protected state from a normal state based on the performance of the one or more anti-authentication protective services;
    responsive to the anti-authentication action, providing an anti-authentication token to a third party authentication service, different from the remote computer security service, that alerts the third party authentication service to take security measures regarding data, systems or user accounts associated with a user associated with the subscriber anti-authentication account; and
    after performing the one or more anti-authentication protective services, performing, on the computing device, a cleaning operation that deletes data traces indicating that an anti-authentication credential was input to the computing device and that the one or more anti-authentication services have been performed.

2. The method according to claim 1, wherein
the anti-authentication action relates to a sequence of actions involving an interaction by a user with the computing device that, when performed, causes the remote computer security service or the anti-authentication application instance to protectively alter a state of data of the computing device.

3. The method according to claim 1, wherein
if no network connectivity can be established between the computing device and the remote computer security service, the anti-authentication application operates independently of the remote computer security service to alter the computing device to the protected state.

4. The method according to claim 1, wherein
in the protected state, the anti-authentication application instance cloaks a subset of designated protected data maintained on the computing device based on anti-authentication policy associated with a subscriber anti-authentication account with the anti-authentication service.

5. The method according to claim 4, wherein:
cloaking the subset of designated protected data includes encrypting by the remote computer security service or the anti-authentication application instance the subset of designated protected data with a public cryptographic key of an asymmetric key pair of the remote computer security service; and
only a private cryptographic key of the asymmetric key pair of the remote computer security service can decrypt the subset of designated protected data and revert the computing device to the normal state.

6. The method according to claim 1, wherein
in the protected state, the anti-authentication application instance or the remote computer security service deletes designated protected data from one or more memory devices of the computing device based on anti-authentication policy associated with the subscriber anti-authentication account with the remote computer security service.

7. The method according to claim 1, the method further comprising:

registering the computing device to the anti-authentication account with the remote computer security service;

designating protected data associated with the subscriber device; and enabling access to the protected data to one or more of the remote computer security service and the anti-authentication application instance.

8. The method according to claim 1, wherein registering a first anti-authentication action with the subscriber anti-authentication account; and registering an authentication action with the subscriber anti-authentication account that reverts the subscriber device from the protected state to the normal state, wherein the registered authentication action is distinct from a standard authentication action implemented for accessing the computing device in the normal state.

9. The method according to claim 1, wherein the anti-authentication action includes an input of anti-authentication credentials at the computing device, the anti-authentication credentials including a set of credentials that is registered with the remote computer security service that, when received at the computing device, causes the anti-authentication application instance to covertly alter a state of the computing device to protect one or more features or data of the computing device while contemporaneously providing access to the computing device.

10. The method according to claim 9, wherein the anti-authentication credentials relate to credentials for an illegitimate access to or an illegitimate control of the computing device that differ from authentication credentials for a legitimate access to or a legitimate control of the computing device.

11. The method according to claim 9, wherein a plurality of distinct anti-authentication credentials are registered to the subscriber's anti-authentication account with the anti-authentication service;

each of the plurality of distinct anti-authentication credentials, when received at the computing device, causes an execution of a distinct anti-authentication protection of the computing device.

12. The method according to claim 1, further comprising:

at a registration of the subscriber anti-authentication account with the remote computer security service:

identifying a blacklist of computer device items comprising a selection of one or more configuration states, one or more functions, one or more types of data, one or more corpus of data, one or more features, or one or more applications of the computing device; and in response to receiving anti-authentication credentials at the computing device, automatically and protectively altering the blacklist of computer device items.

13. The method according to claim 1, further comprising:

at a registration of the subscriber anti-authentication account with the remote computer security service:

identifying a whitelist of computer device items comprising a selection of one or more configuration states, one or more functions, one or more types of data, one or more corpus of data, one or more features, or one or more applications of the computing device; and in response to receiving anti-authentication credentials at the computing device, automatically and protectively altering the computer device with an exception to the whitelist of computer device items.

14. A method of securing an online subscriber account with a remote security service, the method comprising:

identifying an online subscriber account that is subscribed to a remote security service, wherein the online subscriber account comprises an anti-authentication application instance provided by the remote security service based on a subscription;

identifying an occurrence of an anti-authentication action involving the online subscriber account based on anti-authentication policy set to a subscriber anti-authentication account with the remote security service for the online subscriber account;

responsively to the anti-authentication action, automatically performing by the anti-authentication application instance one or more anti-authentication protective services by protectively altering the online subscriber account based on the anti-authentication policy, wherein the online subscriber account is altered to a protected state from a normal state based on the performance of the one or more anti-authentication protective services;

responsive to the anti-authentication action, providing an anti-authentication token to a third party authentication service, different from the remote security service, that alerts the third party authentication service to take security measures regarding data, systems or user accounts associated with a user associated with the online subscriber account; and after performing the one or more anti-authentication protective services, performing, on the online subscriber account, a cleaning operation that deletes data traces indicating that an anti-authentication credential was input to the computing device and that the one or more anti-authentication services have been performed.

15. The method according to claim 14, wherein the anti-authentication action relates to a sequence of actions involving an interaction by a user with the online subscriber account that, when performed, causes the remote computer security service or the anti-authentication application instance to protectively alter a state of data of the online subscriber account.

16. The method according to claim 14, wherein the anti-authentication action includes an input of anti-authentication credentials at the online subscriber account, the anti-authentication credentials including a set of credentials that is registered with the remote computer security service that, when received via an interface associated with the online subscriber account, causes the anti-authentication application instance to covertly alter a state of the online subscriber account to protect one or more features or data of the online subscriber account while contemporaneously providing access to the online subscriber account.

17. The method according to claim 14, wherein in the protected state, the anti-authentication application instance or the remote security service deletes designated protected data from one or more memory devices associated with the subscriber online account based on anti-authentication policy associated with the subscriber anti-authentication account with the remote security service.

18. A computer program product for securing a computing resource with a remote computer security service, the computer program product comprising:

a non-transitory computer-readable medium storing computer-executable instructions that, when executed by one or more computer processors, causes the one or more computer processors to perform:

identifying a computing device that is subscribed to a remote computer security service, wherein the computing device comprises an anti-authentication application instance provided by the remote computer security service based on a subscription;

identifying an occurrence of an anti-authentication action involving the computing device based on anti-authentication policy set to a subscriber anti-authentication account with the remote computer security service for the computing device;

responsively to the anti-authentication action, automatically performing one or more anti-authentication protective services by protectively altering the computing device based on the anti-authentication policy, wherein the computing device is altered to a protected state from a normal state based on the performance of the one or more anti-authentication protective services;

responsive to the anti-authentication action, providing an anti-authentication token to a third party authentication service, different from the remote computer security service, that alerts the third party authentication service to take security measures regarding data, systems or user accounts associated with a user associated with the subscriber anti-authentication account; and after performing the one or more anti-authentication protective services, performing, on the computing device, a cleaning operation that deletes data traces indicating that an anti-authentication credential was input to the computing device and that the one or more anti-authentication services have been performed.

19. The computer program product according to claim 18, wherein the anti-authentication action relates to a sequence of actions involving an interaction by a user with the computing device that, when performed, causes the remote computer security service or the anti-authentication application instance to protectively alter a state of data of the computing device.

20. The computer program product according to claim 18, wherein the anti-authentication action relates to a sequence of actions involving an interaction by a user with an online subscriber account that, when performed, causes the remote computer security service or the anti-authentication application instance to protectively alter a state of data of the online subscriber account.

\* \* \* \* \*